United States Patent [19]

Andre

[11] Patent Number: 5,238,459

[45] Date of Patent: Aug. 24, 1993

[54] SPEED REDUCER WITH FRICTION WHEEL FOR MACHINES ROTATING AT A HIGH RATE OF ROTATION, OF THE EPICYCLOIDAL DOUBLE-TRAIN TYPE

[76] Inventor: Bech J. Andre, 391 rue d'Endoume, 13007 Marseille, France

[21] Appl. No.: 834,300

[22] PCT Filed: Apr. 17, 1991

[86] PCT No.: PCT/FR91/00321

§ 371 Date: Feb. 18, 1992

§ 102(e) Date: Feb. 18, 1992

[87] PCT Pub. No.: WO91/16558

PCT Pub. Date: Oct. 31, 1991

[30] Foreign Application Priority Data

Apr. 17, 1990 [FR] France ............................. 90/05094

[51] Int. Cl.[5] ............................................. F16H 13/08
[52] U.S. Cl. ................................................... 475/183
[58] Field of Search ............................ 475/183, 195

[56] References Cited

U.S. PATENT DOCUMENTS

| | | | |
|---|---|---|---|
| 3,254,546 | 6/1966 | Nasvytis | 475/183 |
| 3,267,771 | 8/1966 | Bugg | 475/783 |
| 3,364,761 | 1/1968 | Nasvytis | 475/195 X |
| 3,367,214 | 2/1968 | Nasvytis | 475/183 |
| 3,433,099 | 3/1969 | Nasvytis | 475/183 X |

FOREIGN PATENT DOCUMENTS 0161194  11/1985  European Pat. Off. .
1451418  9/1966  France .

*Primary Examiner*—Dirk Wright
*Attorney, Agent, or Firm*—Ostrolenk, Faber, Gerb & Soffen

[57] ABSTRACT

A friction-wheel speed reducer for machines rotating at high speed of rotation of the epicycloidal double train type employing between a drive rotor (2) and the output shaft (3) of a driven rotor the mechanical drive effects by rotary friction which are obtained by the rolling of friction wheels which are strongly applied against each other. The forces of application are generated by the centrifugal force resulting from the orbital rotation of mass planetaries (5) of mass (M) and propagated from wheel to wheel up to the drive rotor (2) via outer planetaries (6) provided with wheels (62) on the rim of which they rest, the said outer planetaries (6) being disposed to roll while resting on circular tracks (10) via their bearer hubs (61), the movement of rotation being captured by the side cheeks (31) of a planetary-holder cage (30) and transmitted to the output shaft (3) with which it is integral.

4 Claims, 3 Drawing Sheets

SPEED REDUCER WITH FRICTION WHEEL FOR MACHINES ROTATING AT A HIGH RATE OF ROTATION, OF THE EPICYCLOIDAL DOUBLE-TRAIN TYPE

The object of the present invention is a speed reducer with friction wheels in which the force of application necessary for said wheels is produced by its own operation.

The technical field of the invention is that of devices suitable for capturing the rotary mechanical energy produced by any driving machine, but more particularly when the speed of rotation of said machine is very fast, as is true of steam and gas turbines. In fact, for these turbo-motors, compactness and lightness have as their counterpart very high speeds of rotation exceeding the limit of use of the existing coupling and reduction means, particularly those with gears.

One device intended for this type of application is already know: it is an epicycloidal induction coupler-reducer for machines of very high speed of rotation, described in European Patent 0 161 194 in which the electromagnetic induction is primarily used to capture, at the price of slippage, the mechanical energy of very high speed of rotation in the primary part. On the secondary one, another electromagnetic action transmits the captured torque, but with the assistance of a purely mechanical rolling and rotary friction effect contributed by the centrifugal force acting on its inductor satellites, which are relatively heavy.

The present invention is directed at making an improvement in this prior-art device by a simple design of better efficiency by avoiding electromagnetism, since the latter involves not only a difficult and expensive construction but also, in particular, losses of energy which can scarcely be reduced, as a result of slippage, Joule effect, hysteresis and Foucault currents and therefore a substantial release of heat, which makes cooling means necessary.

The reducer device which forms the object of the present invention employs primarily friction wheels which are strongly applied against each other by radial forces generated upon the placing in rotation of its mobile unit.

The use of friction wheels in order to capture and transmit a torque is known, and numerous friction speed-reducing devices are known, in particular from French Patent 2 205 974 and its Certificate of Addition 2 211 088 which concern a friction epicycloidal reducer which also has planetaries, but in which the force of application of the friction wheels results from the clamping of elastic belts and not from forces related to the operation of the machine as a result of its rotation.

An epicycloidal reducer with centrifugal blocking is also known from French Patent 2 566 868, it having weights which generate a centrifugal effect, but this effect, which is related to rotation, has the purpose there of obtaining a uni-directional drive in case of reversal of the power entrance between the primary and the secondary, and not of producing the forces of application necessary for friction wheels.

As compared with the process employed in the device according to European Patent 0 161 194 using electromagnetic induction, the present invention resides essentially in the means of reversing the direction of the centrifugal force generated by the orbital rotation of the planetaries in order that it also acts, but centripetally, on the drive shaft of high velocity which is located in central position and that, finally, all these primary and secondary friction wheels are applied rather strongly against each other in order to be able to capture and effectively transmit the drive torque without slippage, at least to a certain extent, determined, among other factors, by the materials employed and the dimensioning selected.

As these friction wheels must be perfectly circular, free of roughness and non-deformable under the application force and the milling continuously suffered in rotation, the use of treated and polished hard steel is, first of all, adopted in the form, for instance, of rings coming from "NU" industrial bearings with rollers of special case-hardened steel which are perfectly smooth. However, a very low coefficient of friction results from this so that a very high application force is necessary in order to avoid slippage.

Now, this force must remain well below the mechanical resistance to compression of the steel selected, subject otherwise to rapid alteration, due to the fact that the resting surface between the wheels is reduced to a line of metal-to-metal contact. Also, in order to increase the performance and the mechanical life of the device, the use of other materials having a better coefficient of friction is desirable in order to reduce the application force, then permitting less hardness or even a state of surface more favorable to an increasing of the adherence. This is why the present invention also covers the use of any metal other than steel and even of homogenous or composite, more or less hard non-metallic materials such as plastics, ceramics, elastomers with carbon fibers or others.

Another feature distinguishes the present invention from the one previously described, namely the possible use of booster gears. In fact, in the electromagnetic induction system, the capturing of the drive torque is necessarily asynchronous due to the relative sliding which this system requires between driving wheel (armature) and driven wheel (field magnet); therefore, there can be no coexistence with gears which give a synchronous transmission. In the present invention, on the other hand, as long as there is no slippage all the friction wheels can operate in synchronism with gears, in the manner of a cog railway.

Now, up to the limit of adherence, the teeth of the booster gears backing up the friction wheels theoretically do not bear any torque so that their threshold of failure is brought to higher speeds of rotation, even with precarious lubrication. It follows from this that the arrangement in accordance with the present invention can be mixed, that is to say, with gears supplementing the friction wheels in order to eliminate any risk of accidental or fortuitous slippage, in particular upon starting at low speed.

Suitable for all types of drive engines whether faster or slower, and steam or gas turbines in particular, the arrangement in accordance with the invention can also be used conversely as speed multiplier from any motor of low speed in order to drive receivers of high speed of rotation, such as centrifuges, centrifugal compressors, and the like.

The advantages and characteristics of the present invention will become clearer from the following description which refers to the accompanying drawing in which one non-limitative embodiment is shown.

Figure 1:
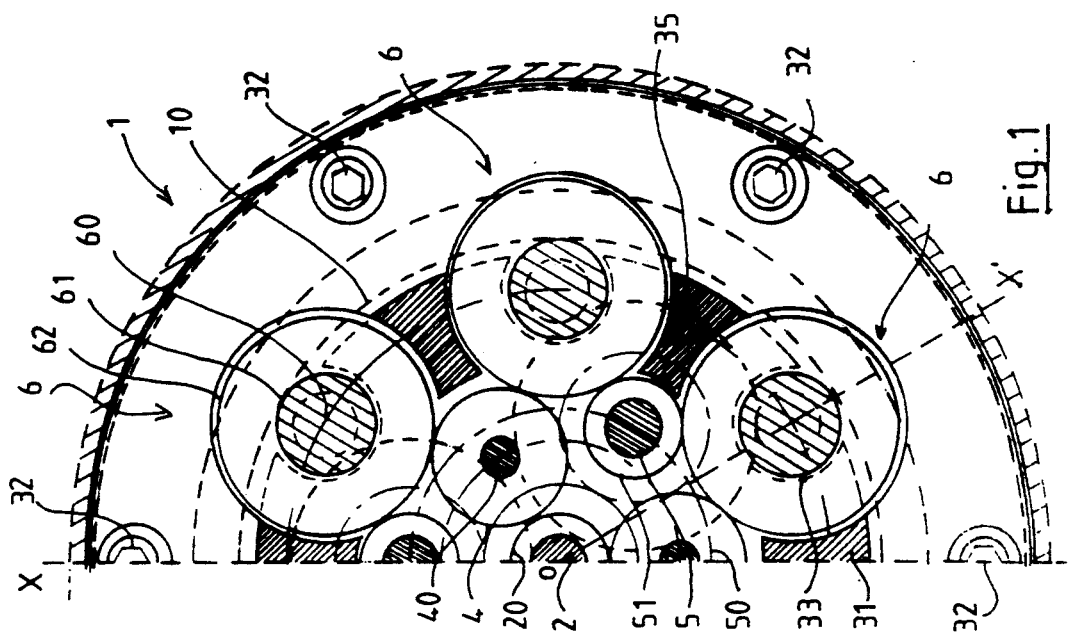
FIG. 1 is a half cross section through the device according to the invention.
Figure 2:
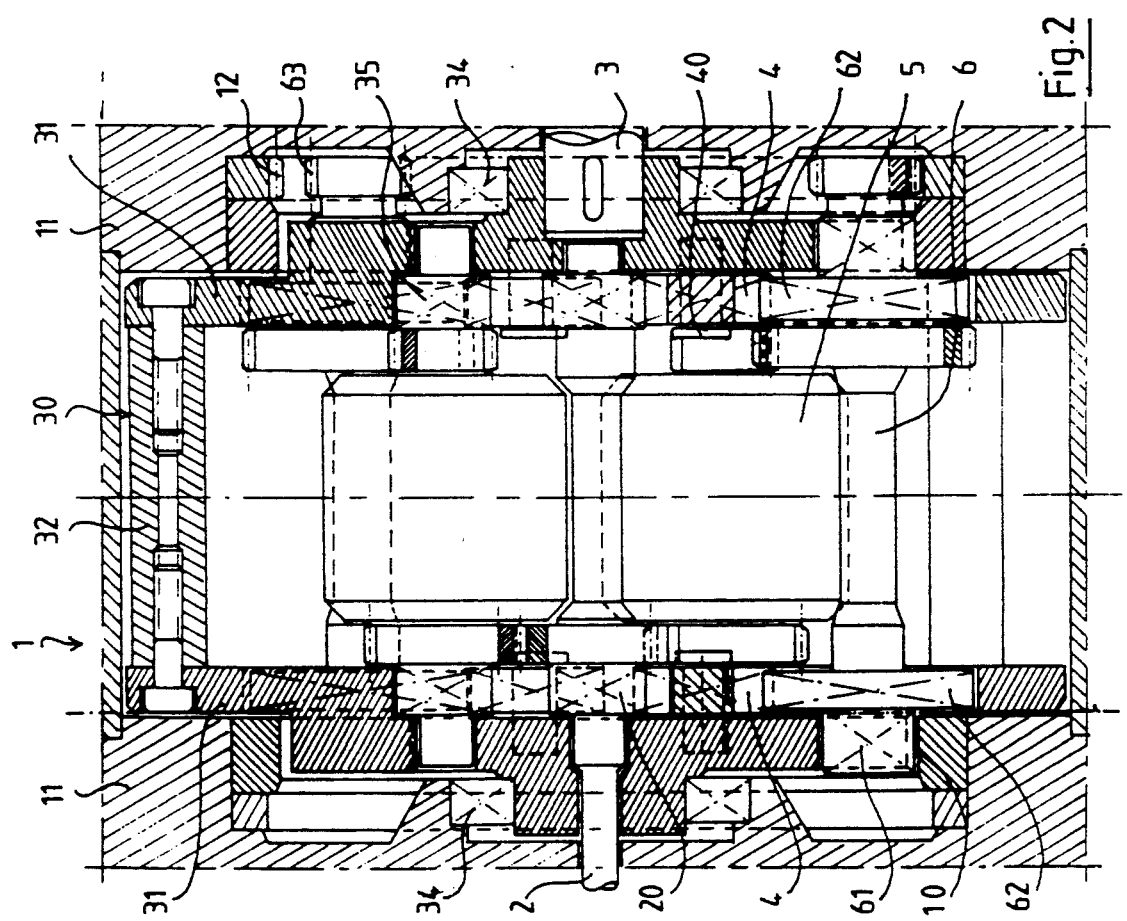
FIG. 2 is a longitudinal section along the two planes defined by the axes XOX' of FIG. 1.
Figure 3:
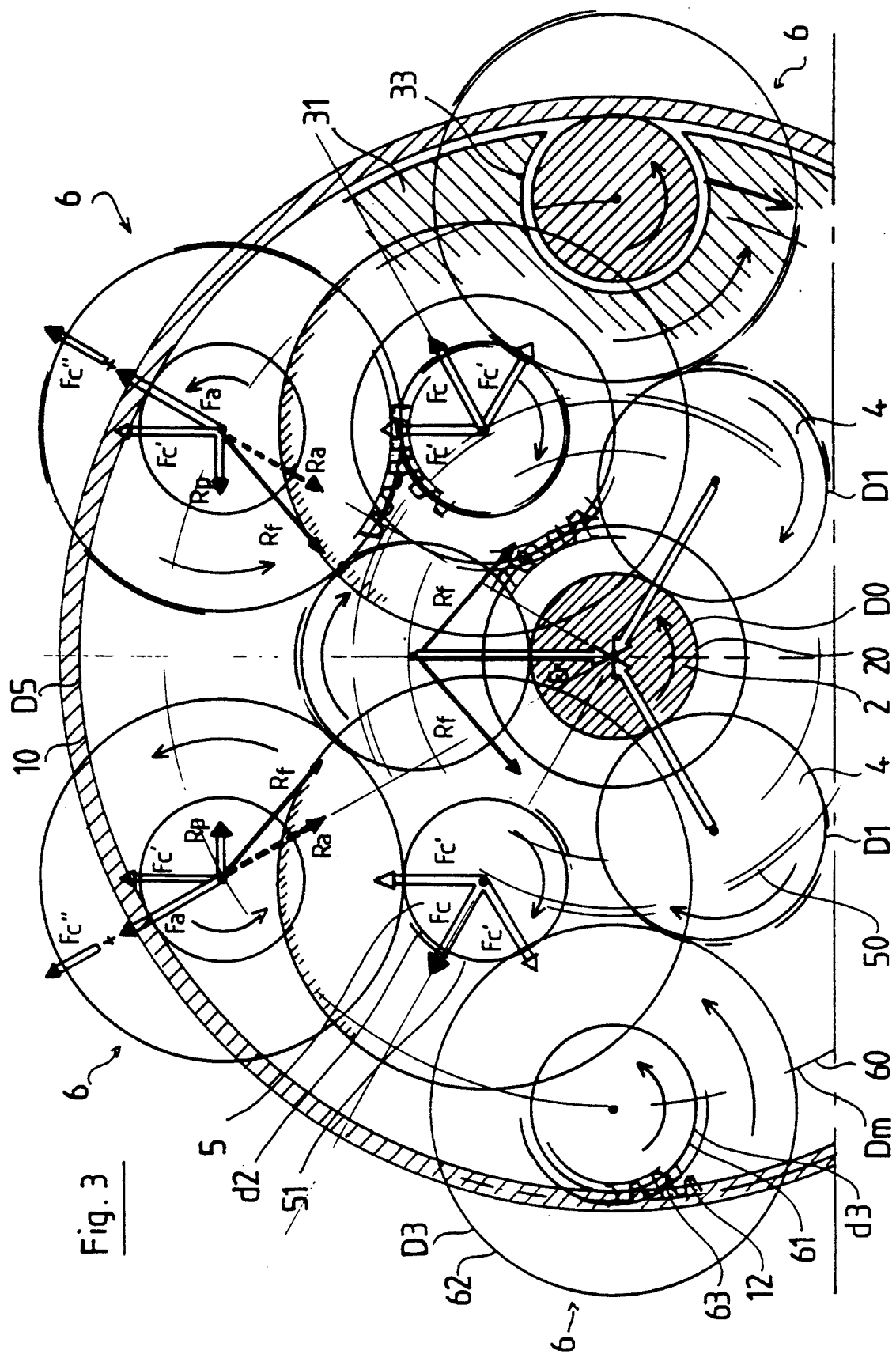
FIG. 3 is a transverse geometrical half-drawing showing the arrangement, in principle, of the different friction wheels and masses generating their forces of application, with vector representation of the latter.

Referring to FIGS. 1, 2 and 3, it can be seen that the general arrangement of the reducer in accordance with the invention is that of a conventional epicycloidal reducer with gears having two planetary orbits, each wheel of which would have its teeth broken off and be reduced to its pitch circumference, also known as friction circumference, all being in contact in pairs, strongly applied by the effect of the means described below.

The active turning part of the reducer of the invention is contained within a cylindrical surrounding recess 1 having two circular rolling tracks 10 of large diameter D5, each fastened concentrically in one of its two side covers 11.

This turning assembly comprises:

a central drive rotor or primary shaft 2 driven at the speed N0 of the drive machine by the input shaft coming from the outside, imparting to it the drive torque of rapid rotation to be captured and converted. This central drive rotor 2 is characterized by the pitch diameter D0 of the raceways which its two bearing hubs 20 has;

a concentric assembly, referred to as satellite-holder cage 30, turning on two ball bearings 34 of the surrounding recess 1, rigidly connected with the output shaft 3 debouching to the outside, on the side opposite the preceding input shaft 2 in order to drive the receiving machine at the reduced output speed N2. This cage 30 is formed of two side cheeks 31 which are firmly connected together and spaced apart by braces 32.

The central drive rotor 2 is supported on its two ends, each provided with a raceway of diameter D0 by three idle rollers 4 of diameter D1 which are arranged 120° from each other, turning freely on three shafts 40 located in each of the two side cheeks 31. Thus, each end 20 of the central drive rotor 2 rests on these idle rollers 4 at three points spaced 120° apart which constitute a rolling bearing, without any harmful passive resistance, due to the fact that in this way all friction participates actively in the transmission of the movement.

The satellite-holder cage 30 drives, in orbital rotation, two types of satellites or planetaries which constitute the basis of the mechanism:

three satellites of mass M called mass planetaries 5 arranged 120° apart and located 60° on each side of the idle rollers 4 and gravitating on an orbit circle 50, the diameter DM or radius RM of which is determined by the position of three housings 35 provided in each side cheek 31, receiving their stub shafts or hubs 51 of diameter d2.

six peripheral satellites called outer planetaries 6 of smaller mass m, spaced 60° apart and located 30° on each side of the three mass planetaries 5 for which they serve as support, gravitating on a larger orbit circle 60 of diameter Dm or radius Rm determined by the position of six open housings 33 provided on the periphery of each cheek 31, receiving their stub shaft or hub 61 of diameter d3.

These six outer planetaries 6 comprise, adjacent to each of their hubs 61 of diameter d3, a wheel 62 of larger diameter D3. Each pair of two wheels 62 belonging to two adjacent outer planetaries constitutes one of the two rotating support bearings of a mass planetary 5 in concordance on the cheeks 31 with a housing 35 which has only a positioning role since the radial play provided for this recess 35 is such that, in operation, it does not support any force and therefore is not the seat of any passive resistance. On the other hand, the two tangential forces of rotary friction exerted on the wheels 62 by the hubs 51 of the mass planetaries 5 participate in the synchronization of their rotation and therefore in the equi-transmission of the torque of the assembly.

These outer planetaries 6 also rest via their two shaft ends or hubs 61 engaged in the half bearings which are constituted by the open housings 33, in the bore of the two stationary rolling tracks 10 of diameter D5 or radius R5 incorporated in the surrounding casing 1. They roll therein, strongly sustained by the centrifugal force, their spacing being maintained by open housings 33 of the cheeks 31. The tangential thrust coming from this rolling acts on one side of these half bearings, imparting to it the resultant rotary movement, in the direction of said thrust, as well as to the cage 30 and to the output shaft 3 which is fastened to it.

The wheels 64 of two adjacent outer planetaries 6, which are not in contact with the mass planetary 5 itself, are in contact with an intermediate idle roller 4 which connects it kinematically to the central drive rotor 2.

Thus, the central drive rotor 2, by rotary friction, transmits its movement to the idle rollers 4 which transmit it to the wheels 64 and therefore to the hubs 61 of the outer satellites 6 which roll in the two circular races 10 of the surrounding casing 1, thus driving the satellite-bearing cage 30.

Driven in orbital rotation at the speed N2, the mass planetaries 5 turn on themselves at the speed of rotation established by the ratio d2/D0, namely N0 if d2=D0. It is the orbital gravitation of these three masses M which generates the centrifugal force used to apply all the friction wheels of the apparatus against each other.

Also in orbital rotation at the output speed N2, the outer planetaries 6 turn on themselves at the speed of rotation N1. Although less heavy than the three mass planetaries 5, the centrifugal force resulting from the gravitation of these six masses m also participates in the mechanical drive effects by friction rolling.

The stub shafts or hubs of all the planetaries have races similar to those of diameter D0 provided on the central drive rotor 2, but their diameters—d2 for the mass planetary 5 and d3 for the outer planetary 6—can be either equal to D0 or different, the diameter d3 participating in the ratio of the final reduction, but not d2.

In operation, the radial play of the idle rollers 4 on their pins 40 is such that the latter do not bear any force as long as said idle rollers 4 are self-centered by the symmetry of the radial forces which act there. These pins 40 therefore also have merely a positioning role, so that the only passive resistances are located at the two ball bearings constituting the supporting bearings 34 for the cage 30 and the six open recesses 33 of each side cheek 31. The idle rollers 4, as well as the large wheels 62 of the outer planetaries 6 constitute intermediate wheels between the hubs 20 of the central drive shaft 2 and the hubs 51 of the mass planetaries 5, so that if the diameter d2 of the latter is equal to D0, the mass planetaries 5 rotate at the speed N0 of the central drive shaft 2, which may be any speed, due to the fact that, aside from their role of synchronizing the wheels 62, they do not transmit the movement which they receive to any other.

The choice consisting in having the central drive rotor 2 clamped at three points 120° apart by 2×3 idle rollers 4 implies the use of three mass planetaries 5 and six outer planetaries 6 and, therefore, angular divisions of 120°, 60° and 30°, as shown in FIG. 3. The diameter D0 of the central drive rotor 2 being selected, the value adopted for that D5 of the fixed race determines the geometry of the assembly and most of the diameters.

In FIG. 3, d2=d3=D0, but these diameters may be different from D0 and also from each other. For example, d3 is smaller than D0, which implies, in order to retain the same D1, enlarging D3 accordingly, as well as d2 if RM is to remain unchanged; for RM is such that the center of the mass planetaries 5 is located, all radial clearances taken up, at the center of the equilateral triangle formed by the axis of the central drive shaft 2 and those of the two adjacent outer planetaries 6. In this way, the largest possible diameter is obtained for the cylindrical mass M borne by each mass planetary 5 and on which there depends, with RM, the value of the centrifugal force generated. However, this arrangement is not necessary, and RM can be smaller to the extent that the space available in length is compatible with the obtaining of the necessary mass M. Also, the length of the apparatus depends on this factor, taking into account the width to be imparted to the various friction wheels, the simultaneous search for the least possible volume and a high rigidity of the shafts in very rapid rotation, making it necessary that they be as short as possible.

The selection of the diameters d2, d3, D3 and the orbital radius RM also determines the diameter D1 of the idle rollers 4. The radial clearance in the recesses 35 of the stub shafts 51 of the mass planetaries 5 permits sufficient reduction of RM to permit the putting in place of all the wheels 62 of the outer planetaries 6. However, in operation their energetic resting on the latter results in slight angular displacements and slightly different eccentricities, shown in dashed line in FIG. 3.

The device in accordance with the invention operates in the following manner: The centrifugal force used to apply the assembly of the friction wheels against each other comes primarily from the driving in orbital rotation of the three mass planetaries 5, each of these three radial forces breaking down into two equal symmetrical forces, oblique at 60°, all clearances taken up. While participating in preponderant manner in the application of the hubs 61 of the outer planetaries 6 against their race 10, the force resulting from these two oblique forces acts in centripetal direction on the central drive shaft 2.

However, the six outer planetaries 6 which are also driven in orbital rotation also generate a centrifugal force Fc" which is proportional to their own weight m and eccentricity Rm but which, being radial, does not carry back towards the central drive shaft 2. In addition, by construction, this weight m is not as great as the weight M of the mass planetaries 5 so that, despite a much larger orbital drive radius, this second centrifugal effect is substantially less. Nevertheless, it adds on to the force of the application received from the masses M by the hubs 61 rolling in the bore of the two stationary races 10.

Each of the mass planetaries 5 resting against the rolling support bearing which the large wheels 62 of the two adjacent outer planetaries 6 constitute for it, the centrifugal force developed radially breaks down into two equal oblique symmetrical 60° vectors which tend to move them apart from each other. It follows that each tends to approach the following outer planetary 6, which also, together with its neighboring one, is subjected to the same spreading effect by the second mass planetary, and so on for the others.

Now, this approaching two by two of the outer planetaries 6 is limited by the presence, resting against each of the two wheels 62, of the intermediate idle roller 4, which is thus pushed towards the center by the two equal convergent forces, the result of which is a centripetal radial force. Thus, while participating in preponderant manner in application on the races 20 of the hubs 61 bearing the outer planetaries 6, the centrifugal force generated by each of the three mass planetaries 5 is transmitted in the direction towards the center in three equal vectors 120° apart by the idle rollers 4 resting against the rings 20 of the central drive rotor 2. The latter is then clamped as in a three-jaw chuck so that, while being supported by the idle rollers 4, as in a bearing, it transmits to them its rotation at high speed by the effect of rotary friction.

There is thus constituted an active bearing which dispenses with any other and which, at the same time, permits the capturing of the drive torque on said shaft, which means is substituted for the electromagnetic induction effect previously used.

Secondly, the drive by rotary friction is effected by the six outer planetaries 6 and also differently, due to the fact that the force of application cumulates here two distinct centrifugal effects, namely that generated by the mass planetaries 5 and that inherent in the weight m of each outer planetary 8.

The forces at play in the arrangement in accordance with the invention are as follows: Let the vector Fc be of radial direction, the size of which corresponds to the centrifugal force generated by each mass planetary 5; it breaks down into two equal and symmetrical vectors Fc', each directed towards the center of the outer planetaries 6 located on opposite sides, forming an angle of 60° with the initial vector Fc. The parallelogram of forces being thus formed of two equilateral triangles, it follows that these two vectors Fc' are equal in size to Fc.

Each of the forces Fc' is transmitted to the outer planetaries 6 by resting against their large wheels 62 and it can therefore be translated at their center in accordance with the direction defined by the line of the centers passing through the point of contact on the large wheel 62 of the corresponding hub 51 of the mass planetary 5. The vectors Fc' break down there then into two forces: the one radial force Fa pushes the hub 61 of this outer planetary 6 against the race 10 and acts on the race 10, thus producing a resting reaction Ra which is equal and of opposite direction; the other, Rp, exerts a thrust in the direction of the adjacent outer planetary 6, perpendicular to the vector Fc' previously translated.

The two forces Ra and Rp which are applied at the center of the outer planetary 6 in question can be composed in direction of the point of rolling contact between the large wheel 62 and the idle roller 4, forming a resultant Rf which can be brought back to the center of the latter, connecting there with another equal force Rf coming from the adjacent outer planetary 6 in accordance with the same scheme. From the composition of these two convergent vectors Rf, there finally results the radial force Er acting on the central drive rotor 2. It is easy to verify that this resultant force is twice the initial centrifugal force Fc, namely $Er = Fc \times 2$.

In the previous arrangements employing electromagnetism, the inductor satellites roll directly in the bore of the race, but here, with identical general dimensioning, the mass planetaries 5 are necessarily on a circular orbit which is reduced approximately by half, as well as their own diameter and therefore their weight; the centrifugal force to which they are subjected is therefore four times less.

Now, in the place of three inductor satellites, we now have six outer planetaries 6 which roll on the stationary race 10, subjected to the same orbital drive at the output speed N2 but with a weight m which is less than M: the centrifugal force generated $Fc''$ is therefore also reduced, but a certain compensation takes place due to the fact that it acts on twelve rollers instead of six and that the resting force of the bearing rollers 61 of each outer planetary 6 is the sum $Q = Fa + Fc''$.

For these friction wheels, it is absolutely necessary to avoid any relative slipping or skidding, subject otherwise to premature and rapidly prohibitive wear. This condition of it not sliding depends on the coefficient of friction resulting from the nature and condition of the surfaces in rolling contact, their lubrication, and the pressure exerted by one on the other. Thus the force of application Er at the level of the central drive shaft 2 between its rings 20 clamped between the idle rollers 4 may be very different from that, Q, which applies the hubs 61 of the outer planetaries 6 against the stationary race 10.

The drive torque capture capacity by the primary of the apparatus depends on the friction conditions of the first, while the transmission capacity by its secondary depends on those of the second; now, the forces of application Er and Q result from the size of the weights m and M so that the obtaining of equivalence between the capture capacity and the transmission capacity leads to optimizing the ratio M/m.

This result can also be obtained by a smaller orbital radius RM, which leads to increasing D3 and has the result of reducing not only Fc but also Fc', with a smaller decrease of M; this solution is to be adopted if it is desired to increase the reduction ratio in which the diameter D3 participates.

If the weight M is to be increased while the preceding dimensioning and the new choice of RM do not permit greater volume, this planetary can be designed with a hollow body weighted with very dense metal, for instance lead.

Booster gears can be adopted for the sole purpose of avoiding the skidding of the hubs 61 of the outer planetaries 6 upon their rolling in the races 10 by means, on each of them, of a pinion 63 of pitch diameter d3 acting on an inner gear 12 of pitch diameter D5. One can also contemplate mechanical connection between the three mass planetaries 5 and the six outer planetaries 6 by means of a train of ratio d2/D3 with a low if not zero working rate. Finally, in order to avoid any possible slippage, in particular in case of sudden variation of the speed, and taking into account the inertia of the mass planetaries 5, a connection can be contemplated by a train of ratio d2/D0 between these last three and the central drive rotor 2, the rate of work being here also zero in continuous established speed so that, despite the size of the values of the speeds of rotation, these accompanying toothings must hold, even with precarious lubrication.

The present invention therefore makes it possible to discharge the gear teeth of a reducer operating at very high speeds of rotation by transfer of their work to friction wheels so that they only have to play a role of synchronization and possible boostering. Furthermore, this system avoids any construction constraints of fixed bearings. Furthermore, being rolling, they are active here due to the fact that the passive resistances participate in the transmission of the movement.

It is to be noted also that all of these rotors and planetaries turn while resting on each other via friction wheels the diameter of which is precisely the pitch diameter of their accompanying gears, so that the relative positioning of the latter is always perfect, while, on the other hand, the lubrication play of the conventional bearings has a repercussion on the meshing play, which is affected to a greater or lesser extent thereby.

The reduction ratio is established in the following manner: The kinematic chain starts from the central drive shaft 2, turning at the high speed N0, and leads, via the cage 30, to the output shaft 3 which rotates at the reduced speed N2. It passes successively over the friction wheels characterized by their diameter from D0 to D1, from D1 to D3 which is fastened to d3, from d3 to the cage 30 by the tangential thrust resulting from the rolling of d3 on D5; therefore, only the diameters D0, D3, d3 and D5, and not d2 or D1, participate in the expression of the reduction ratio.

The first speed reduction takes place between the rings 20 of the central drive shaft 2 rotating at N0 and the large wheels 62 of the outer planetaries 6 via idle rollers which are of a diameter $D1 = D0$, the diameters D0 and D3 intervening so that the speed of rotation of the latter and their attached hubs 61 is $N1 = N0 \times D0/D3$ or $N0 = N1 \times D3/D0$.

The second reduction of speed takes place between the previous hubs 61 of diameter d3 rotating at the speed N1 and the race 10 on which they roll, driving the cage 30 along in this movement at the speed N2. For an ordinary reducer, one would have an output speed $N2 = N1 \times (d3/D5)$ so that $N0/N2 = (D3/D0)/(d3/D5)$, namely $N1 = N0 \times (D0/D3)$ or $N0 = N1 \times (D3/D0)$ and $N2 = N1 \times (d3/D5)$.

But as a planetary system is concerned, this ratio is to be increased or decreased by 1 depending on whether the direction of rotation of the driving shaft 2 and of the output shaft 3 are the same or opposite, so that finally, $N0/N2 = (D3 \times D5)/(D0 \times d3) \pm 1$.

Figure 4:
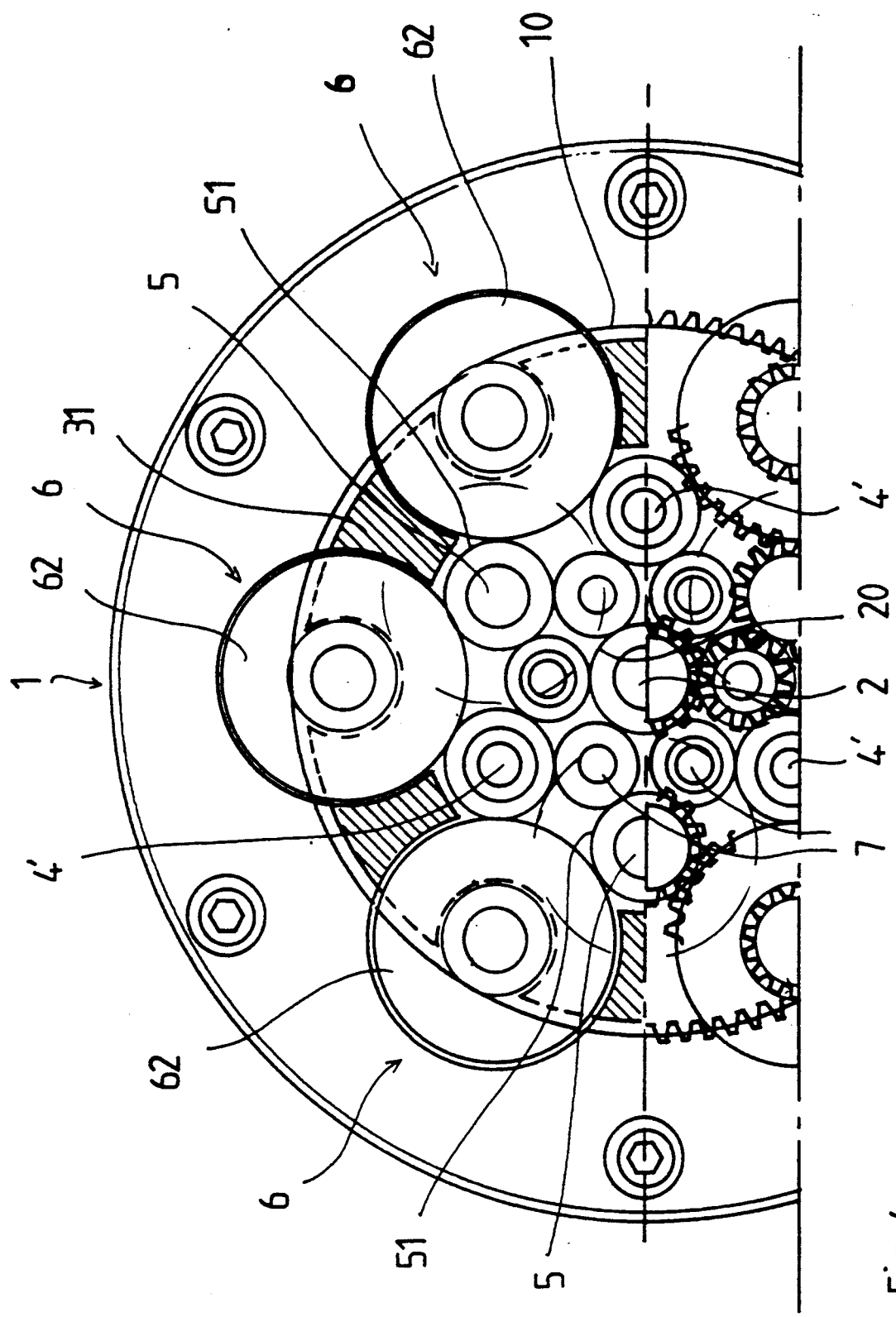
FIG. 4 is a half cross section through a second embodiment of the arrangement in accordance with the invention.

If one now refers to FIG. 4, one can note in said figure another embodiment of the reducer in accordance with the invention. In the first embodiment, in fact, although connected to the drive rotor by a gearing torque, the mass planetaries do not play any role in the reduction of speed. They are only subjected to turning on themselves in synchronism with the wheels on which they rest. However, it is due to them and the two series of three idle rollers that the directions of rotation of the primary and secondary are finally reversed and, therefore, the reduction ratio decreased by 1.

In the second embodiment, in order to find concordant directions of rotation and benefit from the better reduction ratio, the mounting is modified as follows.

The two series of three idle rollers 4 serving as bearing for the drive rotor are replaced by two series of three other rollers 4' of much smaller diameter, that of the hubs of the mass planetaries. These rollers are still in rolling contact with the large wheels 62 of the outer planetaries 62 and, as previously, constitute their limiting spacing stop. However, due to their reduced diameter and the more eccentric position of their bearing shaft, they are no longer in rolling contact with the hubs 20 of the central drive rotor 2, thus losing their former role of carrying bearing, which has devolved upon two series of six additional rollers 7.

These additional rollers 7 are intermediate wheels inserted in the annular space left around the central drive rotor 2, which are carried with play by shafts implanted in each side cheek 31 of the cage 30. It follows that the number of bearing rollers of the central drive roller passes from two series of three at 120° to two series of six at 60°, namely six rolling points supported instead of three, as previously.

The rolling contacts between these two series of six rollers 7 and the two series of three rollers 4' which are more eccentric are located on each side; in the case of a first group of three at 120°, between the hubs 20 of the drive rotor 2 and the series of three idle rollers 4' pushed centripetally each by a pair of large wheels 62 of two outer planetaries 6 which rest there; in the case of the second group of three others, also at 120° but alternating with the previous ones, between the hubs 20 of the central drive rotor 2 and the hubs 51 of the mass planetaries 5, the assembly of these rollers 7 also resting on the two series of rollers 4' each pushed centripetally by a pair of large wheels 62 of two consecutive outer planetaries 6.

This mutual resting is permitted by the direction of the synchronous rotations thus obtained.

The resultant centripetal force received from a pair of large wheels 62 by the roller 4' on which they rest therefore is no longer directly applied on the corresponding hub 20 of the central drive rotor 2. It acts along two oblique and symmetrical directions on two intermediate rollers 7 which are 60° apart.

Now, each of these two rollers 7 constitutes a double support under the effect of these thrusts, on the one hand on a hub 20 of the drive rotor 2 and on the other hand on a hub 51 of a mass planetary 5, so that these two hubs oppose their being further apart from each other.

The assembly being thus statically balanced, it results therefrom that the same thrust, supported by each of these rollers, is pushed back radially on each hub of the drive rotor in centripetal direction.

Finally, each hub of the drive rotor is thus clamped in six points at 60° by the same centripetal force coming from the centrifugal force generated by the three mass planetaries. The result is the same as in the first embodiment, but as the direction of rotation of the driven shaft becomes that of the driving shaft, the reduction ratio is greater, being increased by 2 for equal wheel diameters.

Furthermore, the doubling of the number of points of rolling contact on the drive rotor is beneficial, dividing by 2 the unit resting pressure, so that these mass planetaries can be made heavier in order to increase the capture-transmission capacity of the driving shaft.

Furthermore, due to the presence of an intermediate friction wheel between the hub of the drive rotor and the hub of the mass planetary, which is maintained strongly applied in the force system thus organized, the benefit of the rigorous maintaining of the gearing clearances by constant application between wheels having the pitch diameter of the pinions extends to the now triple train of the accompanying gears connecting these rotors.

In the first embodiment, the case of the double train between drive rotor and each mass planetary is all the more critical since it turns very rapidly and the driven pinion necessarily moves away from the driver located at the center as a result of the taking up of all the mounting plays between wheels; hence, an eccentricity which inevitably increases the gear play.

Finally, the gearings may be all combined on the same side; the organization of their lubrication is easier and the lengthwise space taken up is substantially reduced.

The complication introduced being more apparent than real, this second embodiment may be preferred for these advantages, particularly if a higher reduction ratio is necessary.

I claim:

1. A planetary friction speed reducer comprising:
an input drive rotor, an output shaft, a plurality of idle rollers, a plurality of mass planetaries orbiting the input drive rotor, a further plurality of outer planetaries engaging the mass planetaries and an outer stationary race, each of the outer planetaries having a large diameter wheel portion and a small diameter hub portion, each of the wheel portions engaging one of the mass planetaries and one of the idle rollers, each of the hub portions engaging the outer stationary race, a planetary cage retaining the outer planetaries in an axial and a radial direction and transmitting rotational movement to the output shaft, the mass planetaries having a small freedom of movement in the radial direction and possessing a predetermined mass which is larger than the mass of the outer planetaries such that rotational movement imparted to the input drive rotor causes the mass planetaries to move radially outward thereby increasing the normal force of all engaging surfaces within the speed reducer.

2. A speed reducer according to claim 1, wherein the mass planetaries are formed as metal, hollow bodies, the hollow bodies being filled with a metal or higher density than the metal of the hollow bodies.

3. A speed reducer according to claim 1, including a booster gearing means for providing an additional drive path.

4. A speed reducer according to claim 3, wherein the booster gearing means is provided between the hub of the outer planetaries and the outer stationary ring.

* * * * *

UNITED STATES PATENT AND TRADEMARK OFFICE
CERTIFICATE OF CORRECTION

PATENT NO. : 5,238,459
DATED : Aug. 24, 1993
INVENTOR(S) : Jean André Bech

It is certified that error appears in the above-identified patent and that said Letters Patent is hereby corrected as shown below:

On the title page, item [76] insert:
--Jean André Bech--

Signed and Sealed this

Fourth Day of July, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,238,459
DATED : August 24, 1993
INVENTOR(S) : Jean André Bech

It is certified that error appears in the above-indentified patent and that said Letters Patent is hereby corrected as shown below:

Title page item [19]" delete "Andre" and insert --Bech--.

Signed and Sealed this

Seventh Day of November, 1995

Attest:

BRUCE LEHMAN

*Attesting Officer*　　　*Commissioner of Patents and Trademarks*